(12) United States Patent
Oohashi et al.

(10) Patent No.: US 7,763,999 B2
(45) Date of Patent: Jul. 27, 2010

(54) STATOR FOR ROTARY ELECTRIC MACHINES

(75) Inventors: Masaaki Oohashi, Nagano (JP); Kouji Nakatake, Nagano (JP); Yasushi Yoda, Nagano (JP)

(73) Assignee: Sanyo Denki Co., Ltd, Tokyo (JP)

( * ) Notice: Subject to any disclaimer, the term of this patent is extended or adjusted under 35 U.S.C. 154(b) by 67 days.

(21) Appl. No.: 11/778,975

(22) Filed: Jul. 17, 2007

(65) Prior Publication Data

US 2008/0018185 A1 Jan. 24, 2008

(30) Foreign Application Priority Data

Jul. 20, 2006 (JP) .............................. 2006-198157

(51) Int. Cl.
*H02K 11/00* (2006.01)
(52) U.S. Cl. .................. 310/71; 310/43; 310/49.01; 310/68 R
(58) Field of Classification Search .................. 310/43, 310/49 R, 68 R, 71; H02K 11/00
See application file for complete search history.

(56) References Cited

U.S. PATENT DOCUMENTS

| | | | | |
|---|---|---|---|---|
| 4,689,023 A | * | 8/1987 | Strong et al. ............... 439/189 |
| 5,008,572 A | * | 4/1991 | Marshall et al. ............... 310/45 |
| 5,243,246 A | * | 9/1993 | Sakamoto .................. 310/179 |
| 5,334,897 A | * | 8/1994 | Ineson et al. .................. 310/89 |
| 6,020,661 A | * | 2/2000 | Trago et al. .................... 310/43 |
| 6,359,354 B1 | * | 3/2002 | Watanabe et al. ............. 310/87 |
| 6,729,433 B2 | * | 5/2004 | Uryu et al. ................... 180/444 |
| 6,815,851 B2 | * | 11/2004 | Nishikata et al. .......... 310/67 R |
| 6,822,356 B2 | * | 11/2004 | Suzuki et al. ................. 310/71 |
| 6,867,518 B2 | * | 3/2005 | Kurosawa .................... 310/89 |
| 6,924,570 B2 | * | 8/2005 | De Filippis et al. ........... 310/71 |
| 2001/0048262 A1 | * | 12/2001 | Takano et al. ............... 310/179 |
| 2004/0051417 A1 | | 3/2004 | Yamazaki et al. |
| 2004/0056552 A1 | * | 3/2004 | Miya et al. ................... 310/216 |
| 2004/0150275 A1 | * | 8/2004 | Koyama et al. ............... 310/71 |
| 2004/0256936 A1 | | 12/2004 | Takahashi et al. |

(Continued)

FOREIGN PATENT DOCUMENTS

EP 0 777 312 6/1997

(Continued)

*Primary Examiner*—Quyen Leung
*Assistant Examiner*—John K Kim
(74) *Attorney, Agent, or Firm*—Rankin, Hill & Clark LLP

(57) ABSTRACT

A stator for rotary electric machines is provided, in which a volume occupied by winding portions may be increased and a connecting wire may readily be engaged to prevent from coming off. A plurality of connecting wire engaging hooks 23, with which the connecting wire extending from the winding portion is engaged, are respectively disposed in the vicinity of border portions between a plurality of magnetic pole sections 11 and a yoke 9, corresponding to the magnetic pole sections 11. A mounting location of a connector 29 on a circuit substrate 7 is determined so that all of ends of a plurality of terminal conductors of the connector may be located between adjoining two of the connecting wire engaging hooks 23. With this arrangement, all of the ends 31*a* of the plurality of terminal conductors 31 may be disposed between adjoining two of a plurality of the winding portions 3, and be spaced from the winding portions 3.

3 Claims, 3 Drawing Sheets

U.S. PATENT DOCUMENTS

| | | |
|---|---|---|
| 2005/0052086 A1* | 3/2005 | Miya et al. ............ 310/71 |
| 2005/0088049 A1* | 4/2005 | De Filippis et al. ...... 310/71 |
| 2005/0218861 A1* | 10/2005 | Kimura et al. ......... 318/712 |
| 2006/0220474 A1* | 10/2006 | Yoshida ............... 310/43 |

FOREIGN PATENT DOCUMENTS

| | | |
|---|---|---|
| JP | 1-147652 | 10/1989 |
| JP | 07-250445 | 9/1995 |
| JP | 8-79999 | 3/1996 |
| JP | 11-206057 | 7/1999 |
| JP | 2001-218409 | 8/2001 |
| JP | 2002-209359 | 7/2002 |
| JP | 2004-336897 | 11/2004 |
| JP | 2006-191703 | 7/2006 |
| JP | 2007-129800 | 5/2007 |

* cited by examiner

STATOR FOR ROTARY ELECTRIC MACHINES

BACKGROUND OF THE INVENTION

1. Field of the Invention

The present invention relates to a stator for rotary electric machines.

2. Description of the Related Art

FIG. 13 of Japanese Patent Publication No. 11-206057 shows a stator for rotary electric machines comprising a stator core which includes an annular yoke and a plurality of magnetic pole sections protruding from the annular yoke toward a centerline of the yoke, a plurality of winding portions formed of a winding conductor wound around the magnetic pole sections of the stator core, and a slot insulator which is made of an insulating resin and mounted on the stator core in order to provide electrical insulation between the stator core and the winding portions. The slot insulator includes a plurality of connecting wire engaging hooks which are located at and integrally formed with one of ends thereof, and disposed at certain intervals in a circumferential direction thereof. A connecting wire, which is formed of a part of the winding conductor extending from the winding portions, is engaged with the plurality of connecting wire engaging hooks. The plurality of connecting wire engaging hooks are respectively formed to respectively protrude toward a slot between adjoining two of the plurality of magnetic pole sections. With this arrangement, when inserting a nozzle for winding a winding conductor into the slot between the adjoining two magnetic pole sections of the plurality of magnetic pole sections in order to wind the winding conductor around the plurality of magnetic pole sections, the connecting wire engaging hooks near the slot disturb the nozzle's operation, thereby restricting the movement of the nozzle. As a result, in the conventional arrangement, there is a limitation in increasing a volume occupied by the winding portions in the slot.

FIG. 1 of Japanese Patent Publication No. 11-206057 shows a slot insulator which includes a plurality of wall portions, for guiding the connecting wire along the annular yoke, disposed at intervals in the circumferential direction of the yoke. On outer wall portions of the wall portions, a plurality of protrusions protruding outwardly in a radial direction of the yoke are disposed to prevent the connecting wire from coming off.

However, in the slot insulator configured as shown in FIG. 1 of Japanese Patent Publication No. 11-206057, the connecting wire has to be arranged along an outer surface of the plurality of wall portions for guiding the connecting wire. As a result, there are some problems that when disposing the wiring wire, the movement of the nozzle becomes intricate, and the connecting wire becomes rather long.

SUMMARY OF THE INVENTION

Accordingly, an object of the present invention is to provide a stator for rotary electric machines wherein a volume occupied by winding portions may be increased and a connecting wire may readily be prevented from coming off.

Another object of the present invention is to provide a stator for rotary electric machines, wherein a circuit substrate is supported at one end of a slot insulator and a distance between the circuit substrate and a stator core may be reduced.

A stator for rotary electric machines, of which improvement is aimed in the present invention, comprises a stator core including a plurality of magnetic pole sections that are disposed integrally with an annular yoke and on an inner circumferential portion of the annular yoke at intervals in a circumferential direction of the annular yoke, and that are protruding toward a centerline of the annular yoke, a plurality of winding portions respectively formed of a winding conductor wound around the plurality of magnetic pole sections of the stator core, and a slot insulator made of an insulating resin, which is mounted on the stator core in order to provide electrical insulation between the stator core and the winding portions.

The slot insulator includes a plurality of connecting wire engaging hooks at one ends thereof located in one extending direction where the centerline of the annular yoke extends. The connecting wire engaging hook is integrally formed with the slot insulator and disposed on the one end of the slot insulator at intervals in the circumferential direction, for engaging with the connecting wire formed of a part of the winding conductor extending from the winding portion. In the present invention, the plurality of connecting wire engaging hooks are respectively disposed in the vicinity of border portions between the magnetic pole sections and the yoke, corresponding to the plurality of magnetic pole sections.

According to the present invention, the plurality of connecting wire engaging hooks are respectively disposed in the vicinity of border portions between the magnetic pole sections and the yoke, corresponding to the plurality of magnetic pole sections, and accordingly the connecting wire engaging hook is not disposed in the slot between the adjoining two magnetic pole sections unlike the conventional arrangement. Accordingly, when winding the winding conductor, the nozzle may be moved smoothly within the slot without being disturbed by the connecting wire engaging hooks, and the volume occupied by the winding portions may be increased. In addition, since the plurality of connecting wire engaging hooks are respectively disposed in the vicinity of the border portions between the plurality of magnetic pole sections and yoke, the movement of the nozzle at the time of forming the connecting wire may be simplified. As a result, the connecting wire need not to be long and the connecting wire may readily be disposed.

A circuit substrate which includes a wiring pattern electrically connected to the plurality of winding portions may be supported at the one of the ends of the slot insulator. A connector is mounted on a front surface of the circuit substrate located in the one extending direction. A plurality of terminal conductors of the connector penetrate the circuit substrate in a thickness direction, and protruding toward the winding portions. Ends of the plurality of terminal conductors protruding from the circuit substrate are soldered and connected to electrodes disposed on a rear surface of the circuit substrate, opposed to the front surface of the circuit substrate. In this case, it is preferred that a mounting location of the connector on the circuit substrate is determined so that all of the ends of the plurality of terminal conductors may be located between adjoining two of the connecting wire engaging hooks.

The winding portion formed of the winding conductor wound around the magnetic pole section is configured to protrude farthest in the one extending direction at a middle portion of the magnetic pole section. Accordingly, when all of the ends of the plurality of terminal conductors are located between the adjoining two of the connecting wire engaging hooks, all of the ends of the terminal conductors are disposed in a space formed between the adjoining two of the winding portions, and spaced from the winding portions. This arrangement makes it possible to prevent the plurality of terminal conductors from being in contact with the winding portions even if the circuit substrate is disposed in the vicinity of the stator core. As a result, a dimension of the stator for rotary electric machines supporting the circuit substrate, in the direction where the centerline extends, may be reduced. Accordingly, the motor may be compact in size by reducing the dimension between the circuit substrate and the stator core.

It is preferred that the slot insulator may include at one end thereof a cylindrical outer wall portion protruding in the direction where the centerline extends. In this case, the circuit substrate may be annular in shape so as to be disposed inside the cylindrical outer wall portion. The plurality of connecting wire engaging hooks may be respectively formed inside the cylindrical outer wall portion and spaced from the cylindrical outer wall portion. With this arrangement, the cylindrical outer wall portion is located outside the connecting wire to protect it. When arranging the connecting wire, the winding conductor is merely inserted into a space formed between the cylindrical outer wall portion and the plurality of connecting wire engaging hooks. Thus, arrangement or formation of the connecting wire becomes simplified.

An outline shape of the cylindrical outer wall portion is arbitrary. For example, when the outline of the cylindrical outer wall portion is a regular polygon in shape, it is preferred that the plurality of connecting wire engaging hooks are respectively disposed inside a plurality of corner portions of the regular polygon. Generally, the connector of the circuit substrate is formed along one side of the regular-polygonal cylindrical outer wall portion. That is, the connector is formed in the mid-position between adjoining two of the corner portions of the regular-polygonal cylindrical outer wall portion. With this arrangement, when the plurality of connecting wire engaging hooks are respectively disposed inside the plurality of corner portions of the regular-polygonal cylindrical outer wall portion, all of the ends of the plurality of terminal conductors of the connector protruding from the circuit substrate are arranged in the space formed between the adjoining two winding portions. As a result, the circuit substrate may be disposed closer to the stator core, and the distance between the circuit substrate and the stator core may be reduced.

A plurality of through holes may be formed in the circuit substrate, piercing the circuit substrate in the thickness direction and being fitted with ends of the plurality of connecting wire engaging hooks. When the ends of the plurality of connecting wire engaging hooks are respectively fitted into the plurality of through holes, the circuit substrate may be disposed closer to the winding portion even though the plurality of connecting wire engaging hooks are provided. In addition, the plurality of connecting wire engaging hooks have a function of guiding the circuit substrate at the time of assembly, and also work to prevent the movement or turning of the circuit substrate in the circumferential direction.

It is preferred that the plurality of through holes respectively have an opening which is open in a radially outward direction as viewed from the centerline. With this arrangement, the plurality of connecting wire engaging hooks may be easily fitted into the plurality of through holes.

According to the present invention, the plurality of connecting wire engaging hooks are respectively disposed in the vicinity of border portions between the magnetic pole sections and the yoke, corresponding to the plurality of magnetic pole sections. As a result, when winding the winding conductor, the nozzle may be moved smoothly within the slot without being disturbed by the connecting wire engaging hooks, and the volume occupied by the winding portions may be increased. In addition, since the plurality of connecting wire engaging hooks are respectively disposed in the vicinity of the border portions between the plurality of magnetic pole sections and the yoke, the movement of the nozzle at the time of forming the connecting wire may be simplified. As a result, the connecting wire need not to be long and the connecting wire may readily be simplified.

DESCRIPTION OF THE PREFERRED EMBODIMENTS

Figure 1:
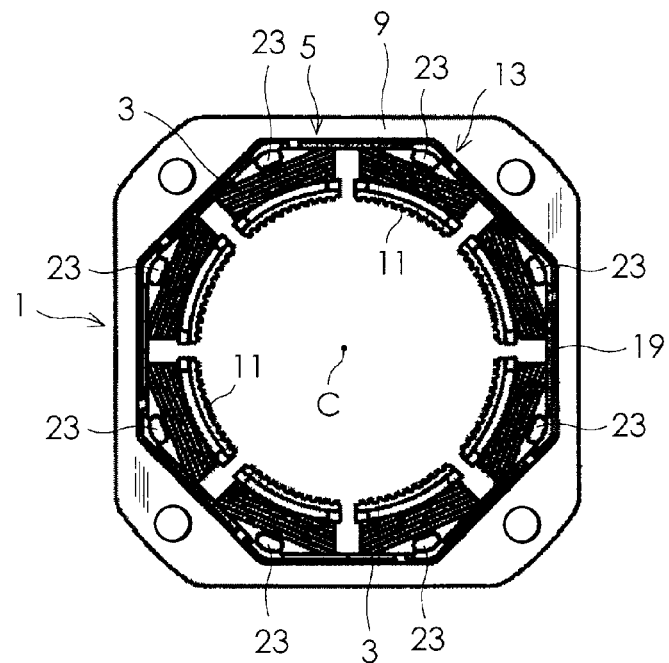
FIG. 1 is a plan view of a stator for rotary electric machines of one embodiment of the present invention.
Figure 2:
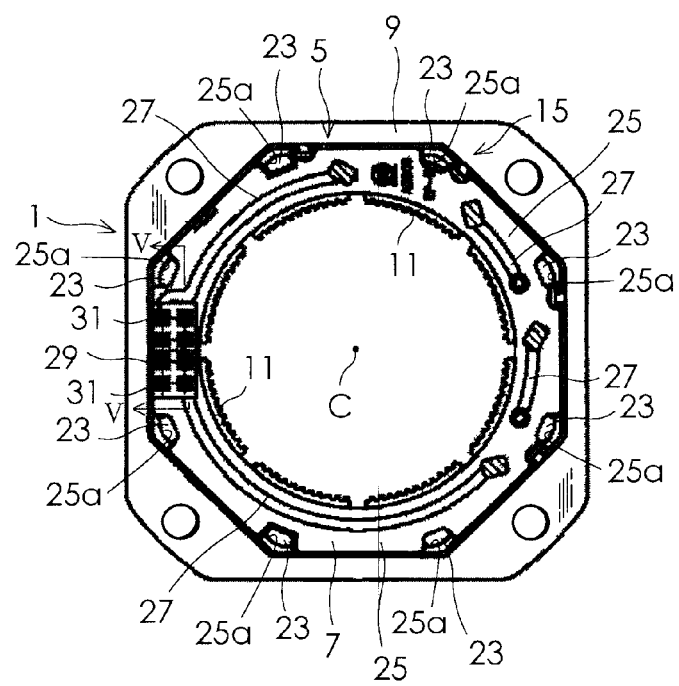
FIG. 2 is a back view of the stator for rotary electric machines of the one embodiment of the present invention.
Figure 3:
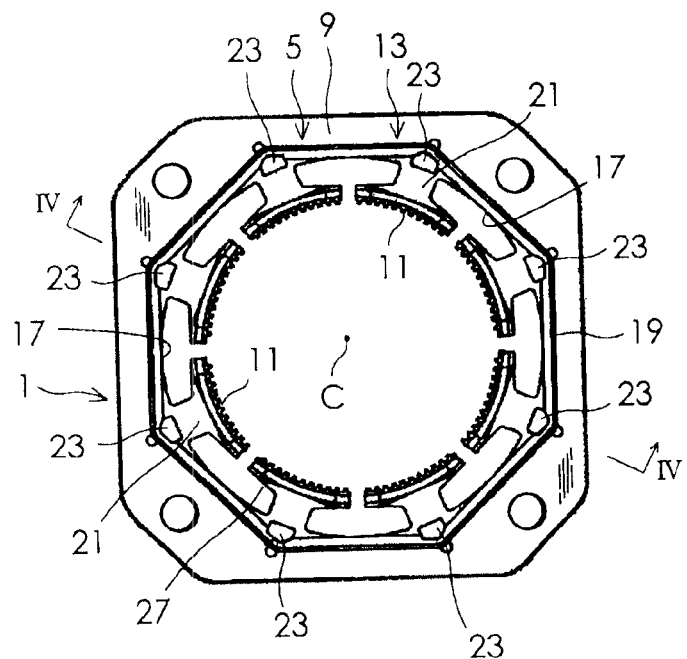
FIG. 3 is an illustration showing the stator of FIG. 1 wherein a winding portion is omitted.
Figure 4:
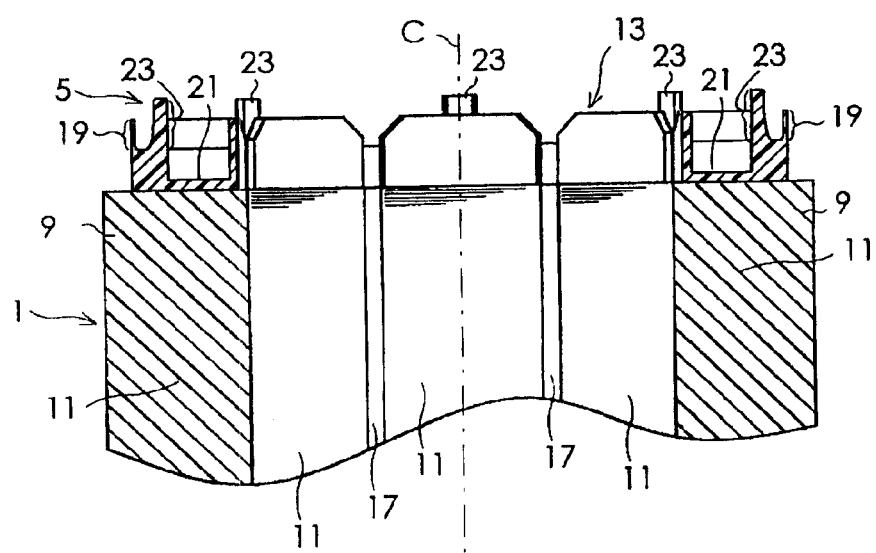
FIG. 4 is a sectional view taken along line IV-IV of FIG. 3.

An embodiment of the present invention will now be described in detail with reference to the accompanying drawings. FIGS. 1 and 2 are respectively a plan view and a back view of a stator for rotary electric machines of one embodiment of the present invention. FIG. 3 is an illustration showing the stator of FIG. 1 wherein an after-mentioned winding portion 3 is omitted. FIG. 4 is a sectional view taken along line IV-IV of FIG. 3. As shown in each figure, the stator for rotary electric machines of the present embodiment comprises a stator core 1, eight winding portions 3, a slot insulators 5, and a circuit substrates 7. The stator core 1 includes an annular yoke 9 and eight magnetic pole sections 11. The eight magnetic pole sections 11 are disposed integrally with the annular yoke 9 on an inner circumferential portion of the annular yoke 9, at intervals in a circumferential direction of the annular yoke 9, and protruding toward a centerline C of the annular yoke 9. The stator core 1 is formed by stacking a plurality of magnetic steel plates of an identical shape in a direction where the centerline C extends. The eight winding portions 3 are respectively formed of a winding conductor wound around the magnetic pole sections 11 of the stator core 1. The slot insulator 5 made of an insulating resin is mounted on the stator core 1 in order to provide electrical insulation between the stator core 1 and the winding portions 3. The slot insulator 5 includes a pair of insulator divided portions 13 and 15, which are fitted with the stator core 1 from both sides of the stator core 1 in the direction where the centerline C extends.

As shown in FIGS. 3 and 4, the insulator divided portion 13, which is one of the pair of insulator divided portions 13 and 15, is made of a synthetic resin, and integrally includes a base portion 17 covering the inner circumferential surface of the yoke 9, a cylindrical outer wall portion 19 whose outline is a regular octagon in shape protruding in the direction where the centerline C extends, eight bobbin portions 21 covering the surface of the magnetic pole sections 11 except magnetic pole surfaces thereof, and eight connecting wire engaging hooks 23. The other insulator divided portion 15 which is the other one of the pair of the insulator divided portions 13 and 15 has basically the same configuration as that of the insulator divided portion 13.

The regular octagonal cylindrical outer wall portion 19 is disposed so that the border portions between the yoke 9 and the eight magnetic pole sections 11 of the stator core 1 may be respectively located in the corner portions of the regular octagon.

The eight connecting wire engaging hooks 23 are an elongated rod in shape having a pentagonal cross section, and are engaged with the connecting wire formed of a part of the winding conductor extending from the winding portion 3. The eight connecting wire engaging hooks are formed at one of ends of the slot insulator 5 located in one extending direction where the centerline C of the annular yoke 9 extends, and are disposed at equidistant intervals in the circumferential direction of the inner circumferential portion of the yoke 9. Accordingly, the eight connecting wire engaging hooks are arranged so as to be respectively disposed in the corner portions of an imaginary regular octagon. The eight connecting wire engaging hooks 23 are respectively disposed in the vicinity of the border portions between the eight magnetic pole sections 11 and the yoke 9, corresponding to the eight magnetic pole sections 11. The connecting wire engaging hooks are protruding from the eight bobbin portions 21 in the one extending direction where the centerline C extends. Accordingly, the eight connecting wire engaging hooks 23 are respectively disposed inside the eight corner portions of the regular octagonal cylindrical outer wall portion 19, and spaced from the cylindrical outer wall portion 19.

As shown in FIG. 2, the circuit substrate 7 includes an electric insulating plate 25, a wiring pattern 27 which is disposed on the electric insulating plate 25 and is electrically connected to the eight winding portions 3, and a connector 29 mounted on one surface of the circuit substrate 7. The electric insulating plate 25 is annular in shape, of which the outer circumference is almost an octagon and the inner circumference is a circle in shape. In the corner portions of the octagon, eight through holes 25a are respectively formed, the through holes piercing the insulating plate 25 in the thickness direction and respectively having an opening that is open in a radially outward direction as viewed from the centerline C. The circuit substrate 7 is disposed inside the cylindrical outer wall portion 19 of the other insulator divided portion 15 so that ends of the eight connecting wire engaging hooks 23 of the insulator divided portion 15 may be fitted into the eight through holes 25a, respectively.

Figure 5:
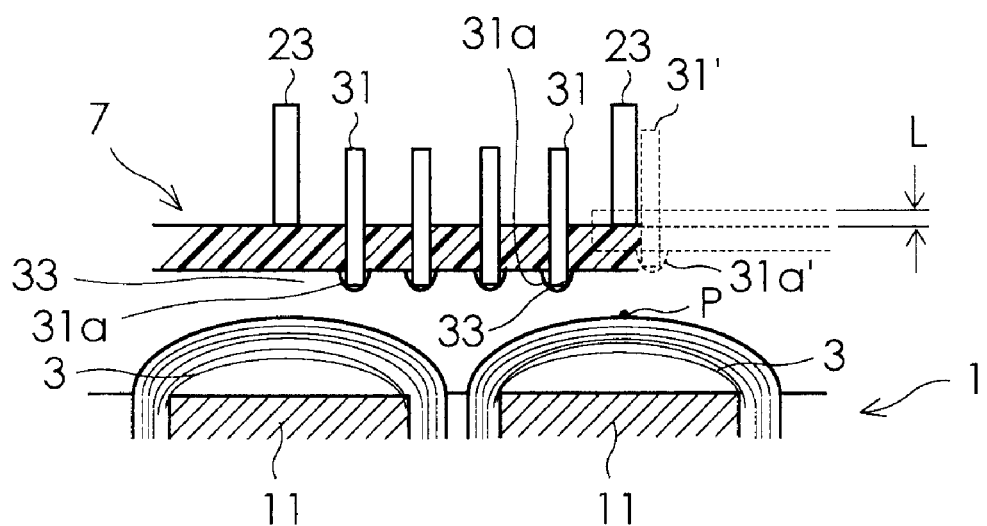
FIG. 5 is a sectional view taken along line V-V.

The connector 29 is formed along one side of the regular octagonal cylindrical outer wall portion 19. That is, it is formed in the mid-position between adjoining two of the corner portions of the regular octagonal cylindrical outer wall portion 19. FIG. 5 is a partial sectional view taken along line V-V of FIG. 2. As shown in the figure, the connector 29 has a plurality of terminal conductors 31. The plurality of terminal conductors 31 penetrate the circuit substrate 7 in the thickness direction thereof, and protruding toward the winding portions 3. Ends 31a of the plurality of terminal conductors 31 protruding from the circuit substrate 7 are soldered and connected to electrodes disposed on a rear surface of the circuit substrate 7, opposed to the front surface of the circuit substrate 7. As mentioned above, since the connector 29 is formed between the adjoining two corner portions of the regular octagonal cylindrical outer wall portion 19, a mounting location of the connector 29 on the circuit substrate 7 is determined so that all of the ends 31a of the plurality of terminal conductors 31 may be located between adjoining two of the connecting wire engaging hooks 23. Accordingly, all of the ends 31a of the plurality of terminal conductors 31 are located between the adjoining two of the winding portions 3, and spaced from the winding portions 3.

In the stator for rotary electric machines of the present embodiment, the eight connecting wire engaging hooks 23 are respectively disposed corresponding to the eight magnetic pole sections 11. As a result, in forming the winding portions 3 by winding the winding conductor, the nozzle may be moved smoothly within the slot without being disturbed by the connecting wire engaging hooks 23, and thereby the volume occupied by the winding portions 3 may be increased. Since the eight connecting wire engaging hooks 23 are respectively disposed in the vicinity of the border portions between the magnetic pole sections 11 and the yoke 9, they may be formed into a desired shape and dimension. Thus, the connecting wire engaging hook 23, which allows the connecting wire to be easily engaged therewith, may be obtained.

In addition, in the stator for rotary electric machines of the present embodiment, since the ends 31a of the plurality of terminal conductors 31 are disposed within a space formed between the adjoining two of the winding portions 3 as shown in FIG. 5, the ends 31a of the plurality of terminal conductors 31 may be disposed in a location where the winding portions 3 protrude little in the direction where the centerline C extends, and may be spaced from the winding portions 3. That is, the ends 31a of the plurality of terminal conductors 31 may be disposed in a location distant from a portion P at which the winding portions 3 protrude farthest in the direction where the centerline C extends. Accordingly, the ends 31a may be disposed closer to the stator core 1 by a length L as compared with a conventional stator wherein ends 31a' of a plurality of terminal conductors 31' are used, as indicated with broken lines. As a result, the stator for rotary electric machines may be compact in size.

Further, the present invention is not limited to the embodiments described above. Various variations and modifications may be made without departing from the scope of the present invention.

What is claimed is:

1. A stator for rotary electric machines, comprising:

a stator core which includes a plurality of magnetic pole sections, the magnetic pole sections being disposed integrally with an annular yoke and on an inner circumferential portion of the annular yoke at intervals in a circumferential direction of the annular yoke, and protruding toward a centerline of the annular yoke, a plurality of winding portions respectively formed of a winding conductor wound around the plurality of magnetic pole sections of the stator core, and a slot insulator made of an insulating resin, which is mounted on the stator core in order to provide electrical insulation between the stator core and the winding portions, the slot insulator including a plurality of connecting wire engaging hooks at one of ends thereof located in one extending direction where the centerline of the annular yoke extends, the connecting wire engaging hook being integrally formed with the slot insulator and disposed on the one end of the slot insulator at intervals in the circumferential direction, for engaging with the connecting wire formed of a part of the winding conductor extending from the winding portion, the plurality of connecting wire engaging hooks being respectively disposed in the vicinity of border portions between the magnetic pole sections and the yoke, corresponding to the plurality of magnetic pole sections, the one end of the slot insulator including a cylindrical outer wall portion protruding in the one extending direction, the plurality of connecting wire engaging hooks being respectively formed inside of and spaced from the cylindrical outer wall portion, wherein a circuit substrate which includes a wiring pattern electrically connected to the plurality of winding portions is supported at the one end of the slot insulator, and the circuit substrate is opposed to the plurality of winding portions;

a connector is mounted on a front surface of the circuit substrate, the front surface being located in the one extending direction;

a plurality of terminal conductors of the connector penetrate the circuit substrate in a thickness direction thereof, and protruding toward the winding portions;

ends of the plurality of terminal conductors protruding from the circuit substrate are soldered and connected to electrodes disposed on a rear surface of the circuit substrate, opposed to the front surface of the circuit substrate;

a mounting location of the connector on the circuit substrate is determined so that all of the ends of the plurality of terminal conductors may be located between adjoining two of the connecting wire engaging hooks;

a plurality of through holes are formed in the circuit substrate, piercing the circuit substrate in the thickness direction and being fitted with ends of the plurality of connecting wire engaging hooks; and the ends of the plurality of connecting wire engaging hooks being fitted into the plurality of through holes.

2. The stator for rotary electric machines according to claim 1, wherein an outline of the cylindrical outer wall portion is a regular polygon in shape; the circuit substrate is disposed inside the cylindrical outer wall portion, and is annular in shape; and the plurality of connecting wire engaging hooks are respectively disposed inside a plurality of corner portions of the cylindrical outer wall portion.

3. The stator for rotary electric machines according to claim 1, wherein the plurality of through holes respectively have an opening which is open in a radially outward direction as viewed from the centerline.

* * * * *